US012609387B2

(12) United States Patent
Deng et al.

(10) Patent No.: US 12,609,387 B2
(45) Date of Patent: Apr. 21, 2026

(54) BATTERY APPARATUS AND ASSEMBLING METHOD THEREOF

(71) Applicant: CALB Co., Ltd., Jiangsu (CN)

(72) Inventors: Feng Deng, Changzhou (CN); Xingyi Zhao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 745 days.

(21) Appl. No.: 17/861,237

(22) Filed: Jul. 10, 2022

(65) Prior Publication Data

US 2023/0327250 A1      Oct. 12, 2023

(30) Foreign Application Priority Data

Apr. 11, 2022    (CN) .......................... 202210372711.6

(51) Int. Cl.
*H01M 50/209* (2021.01)
*H01M 50/262* (2021.01)
*H01M 50/463* (2021.01)

(52) U.S. Cl.
CPC ....... *H01M 50/209* (2021.01); *H01M 50/262* (2021.01); *H01M 50/463* (2021.01)

(58) Field of Classification Search
CPC . H01M 50/209; H01M 50/262; H01M 50/463
See application file for complete search history.

(56) References Cited

U.S. PATENT DOCUMENTS 6,085,854 A * 7/2000 Nishikawa
2022/0037726 A1* 2/2022 Choi et al.

FOREIGN PATENT DOCUMENTS

| CN | 210607410 U | * | 5/2020 |
| CN | 213660545 | | 7/2021 |
| CN | 214957111 | | 11/2021 |
| CN | 215834651 | | 2/2022 |
| CN | 215955398 | | 3/2022 |
| CN | 217334318 | | 8/2022 |

OTHER PUBLICATIONS

CN210607410U_Machine Translation (Year: 2020).*
"Office Action of China Counterpart Application", issued on Mar. 22, 2024, with English translation thereof, p. 1-p. 17.
"Search Report of Europe Counterpart Application", issued on Aug. 21, 2023, p. 1-p. 9.
"Office Action of China Counterpart Application", issued on Oct. 18, 2023, with English translation thereof, p. 1-p. 16.

* cited by examiner

*Primary Examiner* — Niki Bakhtiari
*Assistant Examiner* — Lilian Alice Odom
(74) *Attorney, Agent, or Firm* — JCIP GLOBAL INC.

(57)            ABSTRACT

The present disclosure relates to the technical field of batteries, and discloses a battery apparatus and an assembling method thereof. The battery apparatus includes a first extension member, a second extension member, a separator, and a battery module. The first extension member and the second extension member are intersected to form a plurality of chambers, and each of the chambers is provided with one battery module. The structure of second extension member segmented by the first extension member is provided with a separator, and the separator and the first extension member are located on the same side of the second extension member; the separator is in contact with the battery module.

10 Claims, 8 Drawing Sheets

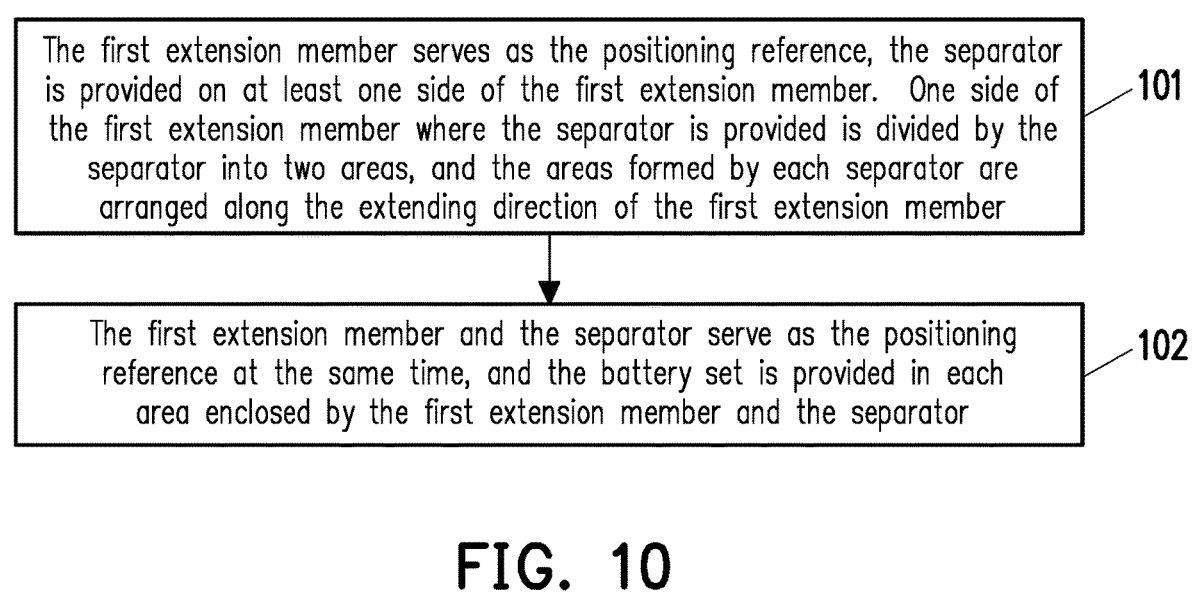

The first extension member serves as the positioning reference, the separator is provided on at least one side of the first extension member. One side of the first extension member where the separator is provided is divided by the separator into two areas, and the areas formed by each separator are arranged along the extending direction of the first extension member    ⟋101

↓

The first extension member and the separator serve as the positioning reference at the same time, and the battery set is provided in each area enclosed by the first extension member and the separator    ⟋102

FIG. 10

BATTERY APPARATUS AND ASSEMBLING METHOD THEREOF

CROSS-REFERENCE TO RELATED APPLICATION

This application claims the priority benefit of China application no. 202210372711.6, filed on Apr. 11, 2022. The entirety of the above-mentioned patent application is hereby incorporated by reference herein and made a part of this specification.

BACKGROUND

Technical Field

The present disclosure relates to the technical field of batteries, and in particular, to a battery apparatus and an assembling method thereof.

Description of Related Art

In the existing design, the assembling method of a battery pack is to assemble the battery box body, and then the batteries are put into the battery box body in sets. The assembling process is complicated, and the assembling of box body and the battery grouping are performed separately, so the efficiency is low, and it is difficult to realize automatic production. In addition, there are a series of unstable factors during the transportation of the box body and the battery, resulting in a decrease in yield rate. However, if the assembling of the box body is to be integrated with the battery assembling process, and the components forming the box body are assembled with the battery respectively, how to quickly and accurately realize the structural positioning of the battery and the components is one of main issues for ensuring the final assembling efficiency and yield rate.

SUMMARY

The present disclosure provides a battery apparatus and an assembling method thereof.

In a first aspect, the present disclosure provides a battery apparatus. The battery apparatus includes a first extension member, a second extension member, a separator and a battery module. The first extension member and the second extension member are arranged to intersect and enclose a plurality of chambers. Each of the chambers is provided with one battery module. The second extension member is segmented by the first extension member and each segment of the structure is provided with one separator. The separator is in contact with the battery module, and the separator and the first extension member are on the same side of the second extension member.

In the battery apparatus provided by the present disclosure, the first extension member and the second extension member are arranged to intersect, and a plurality of independent separators is arranged on the second extension member. The independent separators are arranged at intervals along the extending direction of the second extension member, and located between two adjacent chambers. Each chamber is provided with a battery module, and each battery module may be assembled with the first extension member and the separator as the positioning reference on the two adjacent sides thereof respectively. For example, a first extension member and a separator adjacent thereto may be assembled first, and then the battery module may be assembled with the first extension member and the separator adjacent thereto as the positioning reference. Under the circumstances, the first extension member and the separator adjacent thereto are equivalent to two or three side walls enclosing a chamber, so as to limit the positions of two or three peripheral sides of the battery module. In the meantime, the battery module may be assembled into the chamber from one side or two sides of the chamber that are not limited in position. In addition, the second extension member is assembled last, so as to ensure that both the separator and the first extension member are located on the upper side or the lower side of the second extension member. The second extension member may be connected with a plurality of separators arranged along the extending direction thereof, and may be connected with one or a plurality of first extension members which intersect with the second extension member.

In a second aspect, the present disclosure provides a method for assembling a battery apparatus, including a step of arranging a first extension member and a separator and a step of assembling a battery module, and the steps of arranging the first extension member and the separator and the step of assembling a battery module are performed alternately in sequence.

The steps of arranging the first extension member and the separator include: taking the first extension member as a positioning reference, setting a separator on at least one side of the first extension member. Each of the separators divides the side of the first extension member where the separator is located into two areas, the areas divided by each separator are arranged along the extending direction of the first extension member.

The step of assembling the battery module includes: using the first extension member and the separator as a positioning reference at the same time, and arranging the battery module in each of the areas enclosed by the first extension member and the separator.

In the assembling method of the battery apparatus provided by the present disclosure, there is no need to assemble the box body of the battery apparatus in advance. Rather, the assembling process of the battery is integrated with the assembling step of the box body. First, the battery is connected to part of the structure (first extension member, separator) used to form the box body, and the remaining part for forming the box body is assembled to form the complete box body. After assembling the battery, a complete box body is assembled. Moreover, connection between various parts of box body structure that are assembled in sequence may be performed through non-welding means such as bonding and/or fastener. In addition, in this disclosure, the battery module is assembled with the first extension member and the separator adjacent thereto as the positioning reference, and the first extension member and the separator adjacent thereto are used to limit the positions of two or three peripheral sides of the battery module. In the meantime, the battery module may be assembled into the chamber encircled by the first extension member and the separator from one peripheral side or two peripheral sides that are open.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

To facilitate understanding of the present disclosure, reference may be made to the embodiments shown in the following figures. The components in the drawings are not necessarily to scale, and some related components may be omitted in order to emphasize and clearly illustrate the technical features of the present disclosure. Additionally, the relevant elements or components may be arranged differently from those known in the art.

FIG. 10 is a flowchart of a method for assembling a battery apparatus according to an embodiment of the present disclosure.

DESCRIPTION OF THE EMBODIMENTS

Figures 1, 2:
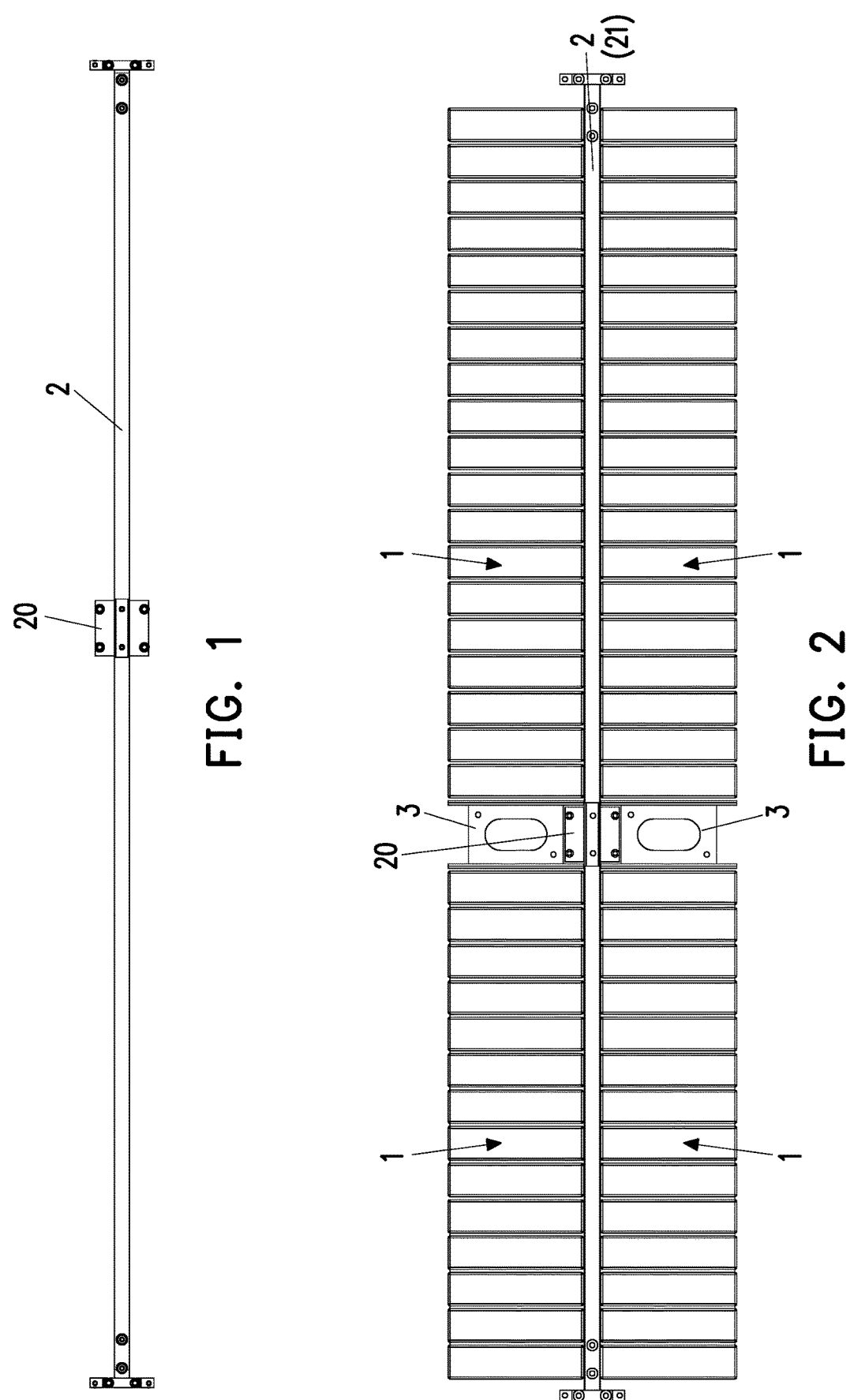
FIG. 1 is a schematic structural view of a first extension member in a battery apparatus according to an embodiment of the present disclosure.
FIG. 2 is a schematic structural view of assembling a battery module with a first extension member and a separator as positioning references in an assembling process of a battery apparatus according to an embodiment of the present disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

At present, with the rise of electric vehicles, new energy battery apparatus used in the field of electric vehicles have been developed rapidly. The battery apparatus typically includes an external sealed box body and a battery module located in the box body. The battery module is composed of square batteries in arrangement, such as square batteries. The box body of the battery apparatus is generally an independent product, which is assembled and integrated by a third party and then supplied to a battery manufacturer, and the battery manufacturer completes battery packing operation to assemble the battery apparatus product. Therefore, the production period of battery apparatus is long and production efficiency is low, and the production process is not suitable for automated production. Moreover, quality problems occur frequently in the initial stage of box integration and battery assembly, making it difficult to improve the production yield of battery apparatus. In addition, the box body of known battery apparatus is assembled mainly through welding, which easily causes a series of problems affecting the quality, such as dimensional thermal deformation deviation, low primary air tightness permeating rate, performance degradation of secondary repair welding materials, difficulty in removing metal residues on the framework after welding, and system insulation failure caused by welding slag/welding seam.

In view of this, the inventors of the present disclosure designed a battery apparatus and an assembling scheme thereof, which breaks with tradition that adopts the mode in which the box body is manufactured independently. In the disclosure, the box body manufacturing process and the system assembling process are highly integrated, and the components that make up the box body are respectively assembled with the battery. The assembly of the battery can be completed before the complete box body is formed. In this way, the assembly process of the entire battery apparatus can be performed without a gap, thereby avoiding factors that affect the yield rate of the battery apparatus. Moreover, the disclosure makes it possible to establish a fully automated production line, improve production efficiency, achieve high-speed manufacturing, and high-yield manufacturing. However, as compared with directly placing the battery into the chamber of the box body, when the assembly of box body and the assembly of battery are performed alternately, it is difficult to quickly and accurately position the relative positions of components for various parts of the box body and the battery. Therefore, how to achieve fast assembling and positioning is a technical problem that needs to be solved urgently in this new assembly solution.

Therefore, the inventors of the present disclosure designed a battery apparatus and an assembling method thereof, so as to improve the assembling process of the battery apparatus and improve the assembling efficiency and yield rate of the battery apparatus.

In a first aspect, the present disclosure provides a battery apparatus, as shown in FIG. 1 to FIG. 8, the battery apparatus includes a first extension member 2, a second extension member 4, a separator 3 and a battery module 1. The first extension member 2 and the second extension member 4 are arranged to intersect to form a plurality of chambers. Each chamber is provided with a battery module 1. The second extension member 4 is segmented by the first extension member 2 and each segment of the structure is provided with one separator 3. The separator 3 is in contact with the battery module 1 in the chamber adjacent thereto, and the separator 3 and the first extension member 2 are on the same side of the second extension member 4. For example, both the separator 3 and the first extension member 2 are located on one side of the second extension member 4 away from the bottom plate 5 of the box body, or both the separator 3 and the first extension member 2 are located on one side of the second extension member 4 close to the bottom plate 5 of the box body.

In the battery apparatus provided by the present disclosure, the first extension member 2 and the second extension member 4 are arranged to intersect, and a plurality of independent separators 3 are arranged on the second extension member 4. The plurality of independent separators 3 are arranged at intervals along the extending direction of the second extension member 4 and located between two adjacent chambers. Each chamber is provided with a battery module 1, and each battery module 1 may be assembled with the first extension member 2 and the separator 3 as the positioning reference of two adjacent sides thereof, so that fast assembling and positioning can be realized. For example, it may be that a first extension member 2 and a separator 3 adjacent thereto are assembled first, and then the first extension member 2 and the separator 3 adjacent thereto are adopted as the positioning reference to assemble the battery module 1. Under the circumstances, the first extension member 2 and the separator 3 adjacent thereto are equivalent to two or three side walls that enclose the chamber, so as to limit the positions of the two or three periphery sides of the battery module 1. In this manner, the battery module 1 may be quickly assembled and positioned. In the meantime, the battery module 1 may be assembled into the chamber from one side or two sides of the chamber that are not limited in position, so as to prevent adhesive layer scratching that is caused when the battery module 1 has to be over-pressed into the box along a vertical direction and avoid defects such as excessive pressure between the batteries 11. Additionally, the second extension member 4 is assembled last, so as to ensure that both the separator 3 and the first extension member 2 are located on the upper side or the lower side of the second extension member 4. The second extension member 4 may be simultaneously connected to multiple separators 3 arranged along the extending direction thereof, and may be connected with one or more first extension members 2 intersecting with the second extension member 4, so that the connection tightness and connection strength between the structures may be enhanced, and the reliability of the entire box body structure may be improved. In summary, the battery apparatus provided by the present disclosure helps to improve the assembling efficiency and yield rate of the battery apparatus.

It should be noted that the battery apparatus may include at least two first extension members 2 and/or at least two second extension members 4. The first extension members 2 are parallel to each other, the second extension members 4 are parallel to each other, and each first extension member 2 intersects with each second extension member 4 to form a plurality of chambers. Exemplarily, the second extension member 4 and the first extension member 2 are substantially perpendicularly intersected, that is, the extending direction of the second extension member 4 and the extending direction of the first extension member 2 form an included angle of substantially 90 degrees, and there may be a deviation of ±5 degrees, for example.

Exemplarily, as shown in FIG. 1 to FIG. 5, the first extension member 2 may include a longitudinal beam 21, a liquid cooling plate 22 disposed between the battery modules 1 and extending longitudinally, or a longitudinally extending box frame 61 and other structures; the second extension member 4 includes a transverse beam.

In an exemplary embodiment, the first extension member 2 includes alternately arranged longitudinal beam 21 and longitudinally extending liquid cooling plate 22, and the second extension member 4 is a transverse beam. Neither the first extension member 2 nor the second extension member 4 includes the box frame 61, and the box frame 61 is assembled after the transverse beam and the battery module 1 are assembled.

In some embodiments, as shown in FIG. 3 to FIG. 7, the battery apparatus further includes a bottom plate 5 of box body, and the separator 3 and the first extension member 2 are located on one side of the second extension member 4 away from the bottom plate 5 of the box body, that is, the separator 3 and the first extension member 2 are located above the second extension member 4. The bottom plate 5 of box body is located below the second extension member 4, and the bottom plate 5 of box body is connected to the bottom surface of the second extension member 4.

Specifically, after the second extension member 4 is assembled on the separator 3 and the first extension member 2, the bottom plate 5 of box body may be further assembled on the side where the second extension member 4 is located. The bottom surface of one side of the second extension member 4 away from the first extension member 2 is connected to the bottom plate 5 of the box body, such that the multiple separators 3 and the first extension member 2 connected with the second extension member 4 may be connected with the bottom plate 5 of the box body, thereby strengthening the connection tightness of each part of the box body, making the entire box body more firm and reliable. Moreover, the second extension member 4 is closer to the bottom plate 5 of the box body, close to the bottom of the battery module 1, and the separator 3 is arranged on one side of the second extension member 4 away from the bottom plate 5 of the box body, and is close to the top of the battery module 1. Through the position limitation of the second extension member 4 and the separator 3, the battery module 1 may be prevented from coming out of the chamber, and the battery 11 may be prevented from over-expanding during operation, thereby helping to improve the safety performance of the battery apparatus.

Figure 3:
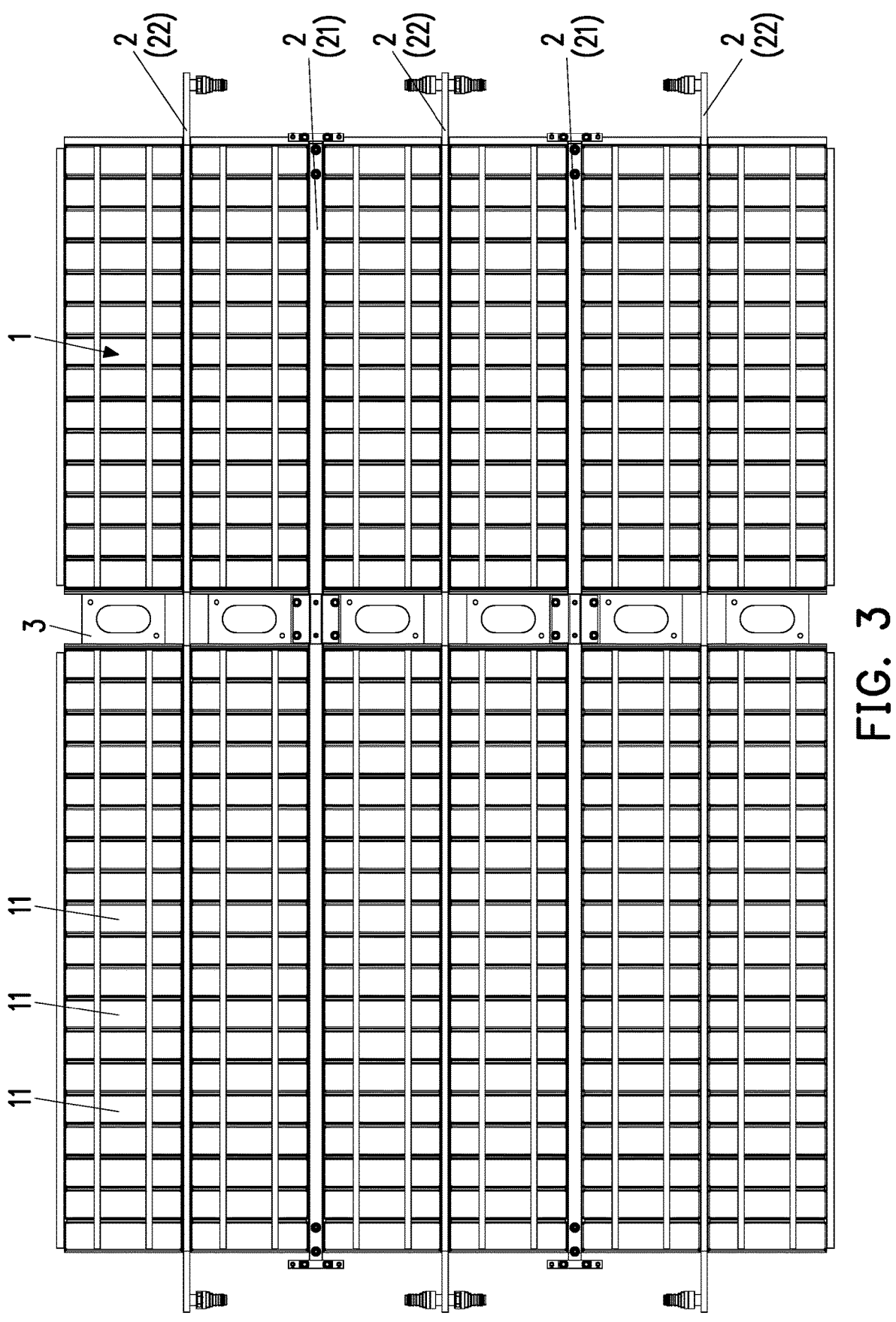
FIG. 3 is a schematic structural view of assembling all of first extension members, separators, and battery module in place during the assembling process of a battery apparatus according to an embodiment of the present disclosure.

In some embodiments, as shown in FIG. 3, the battery module 1 includes a plurality of batteries 11 arranged in a direction perpendicular to the large surface of the battery, and the large surface of the battery 11 at the end portion in the battery module 1 is in contact with the separator 3.

Exemplarily, the battery 11 is in a square shape, such as a square lithium-ion battery 11, and the large surfaces of the battery are the two opposite surfaces with the largest areas among the six surfaces of the battery 11.

Exemplarily, in the direction perpendicular to the large surface of the battery, there may be an interaction force between the large surface of the battery 11 at the end portion and the separator 3, that is, there may be a preload force between the battery module 1 and the separator 3, which may further prevent the battery module 1 from coming out of the chamber and prevent excessive expansion of the battery 11 during operation.

Further, the lateral surfaces of the plurality of batteries 11 in the battery module 1 are adhered to the first extension member 2. In this way, the connection strength between the battery module 1 and the first extension member 2 may be strengthened, thereby improving the connection strength and reliability of the structure of entire box body. Moreover, the lateral surface of each battery 11 in the battery module 1 is adhered to the first extension member 2, so that the entire battery module 1 may be pre-fixed, which may facilitate subsequent assembly operations, and helps to improve the assembly efficiency and yield rate of the battery apparatus.

In some embodiments, as shown in FIG. 3, FIG. 4, FIG. 7, FIG. 8 and FIG. 9, the separator 3 is arranged across the second extension member 4, including a main body portion 31 and two side plates 32 connected to both ends of the main body portion 31 and arranged oppositely. The two side plates 32 are respectively in contact with the two battery modules 1. In this way, the end surfaces of the two adjacent battery modules 1 may be limited in position by the two side plates 32 of the separator 3, which helps to achieve fast assembly and positioning of the battery module 1. Moreover, the separator 3 being arranged across the second extension member 4 through the cooperation of the main body portion 31 and the two sides plates 32 may facilitate the assembly and positioning of the separator 3 and the second extension member 4, which helps to improve the assembly efficiency and yield rate.

In some embodiments, the separator 3 and the second extension member 4 are detachably connected. In this way, the assembly between the separator 3 and the second extension member 4 may be facilitated. For example, the separator 3 and the second extension member 4 may be connected by fasteners such as bolts.

In some embodiments, as shown in FIG. 2, FIG. 3, FIG. 4, FIG. 7 and FIG. 8, the extending direction of the separator 3 is the same as the extending direction of the second extension member 4, and at least one end of the separator 3 in the extending direction is insertion-fitted with the first extension member 2.

The separator 3 extends along the extending direction of the second extension member 4, which may increase the contact area between the separator 3 and the end surface of the battery module 1, thereby improving the assembly and positioning effect of the separator 3 on the battery module 1. Moreover, the assembly and positioning of the separator 3 is facilitated through the insertion cooperation of the separator 3 and the first extension member 2, which helps to enhance the connection tightness and connection strength between the separator 3 and the box body framework 6, and improve the reliability of the structure of entire box body.

Figure 7:
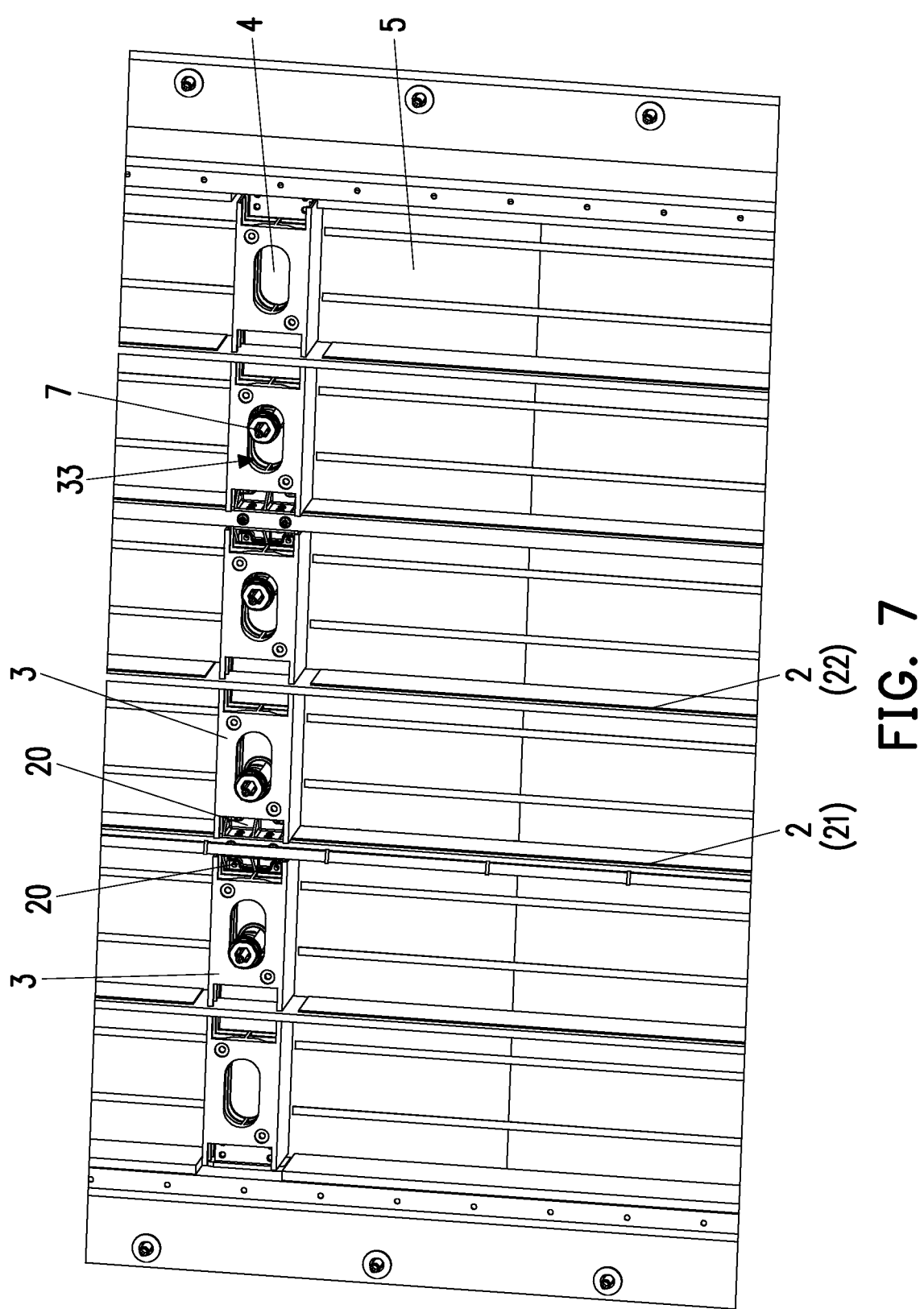
FIG. 7 is a schematic view showing the connection structure of the first extension member, the separator and the second extension member in the box body in a battery apparatus according to an embodiment of the present disclosure.
Figure 8:
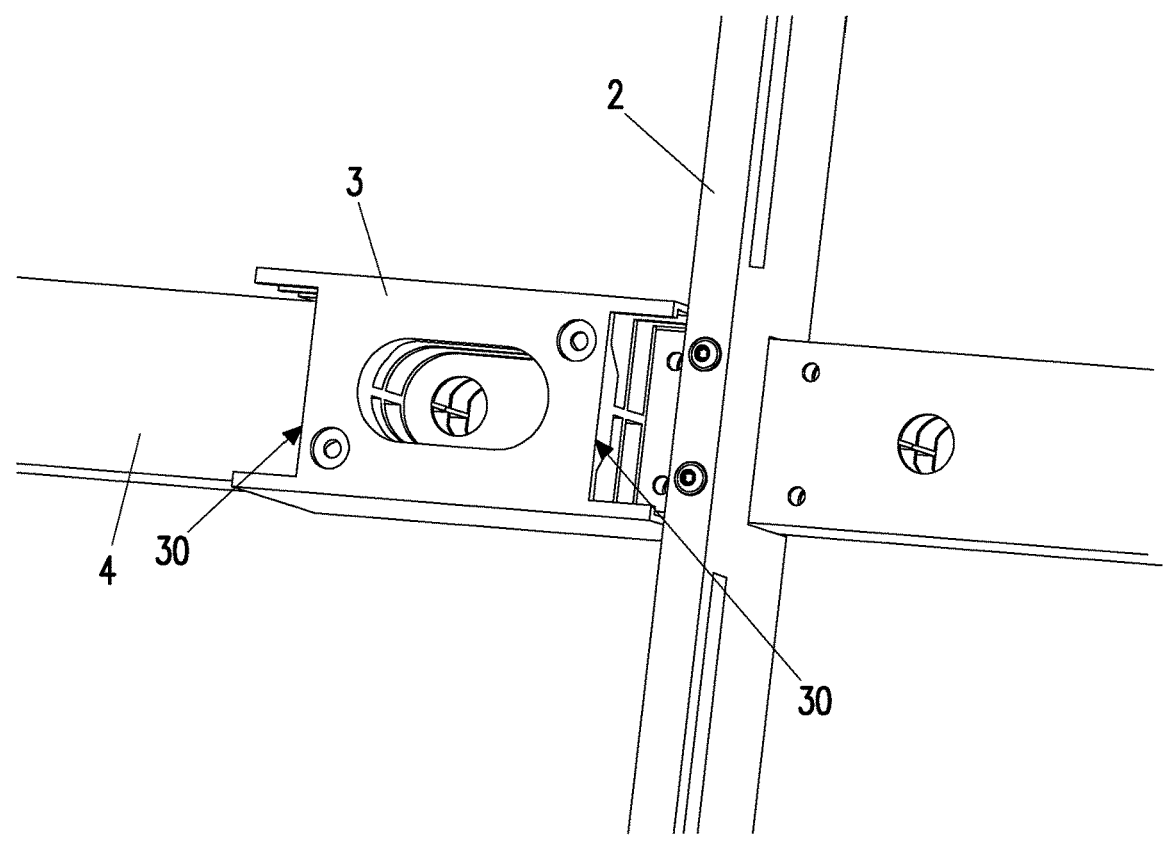
FIG. 8 is a schematic view showing a partial structure of a first extension member, a separator, and a second extension member in a battery apparatus according to an embodiment of the present disclosure.
Figure 9:
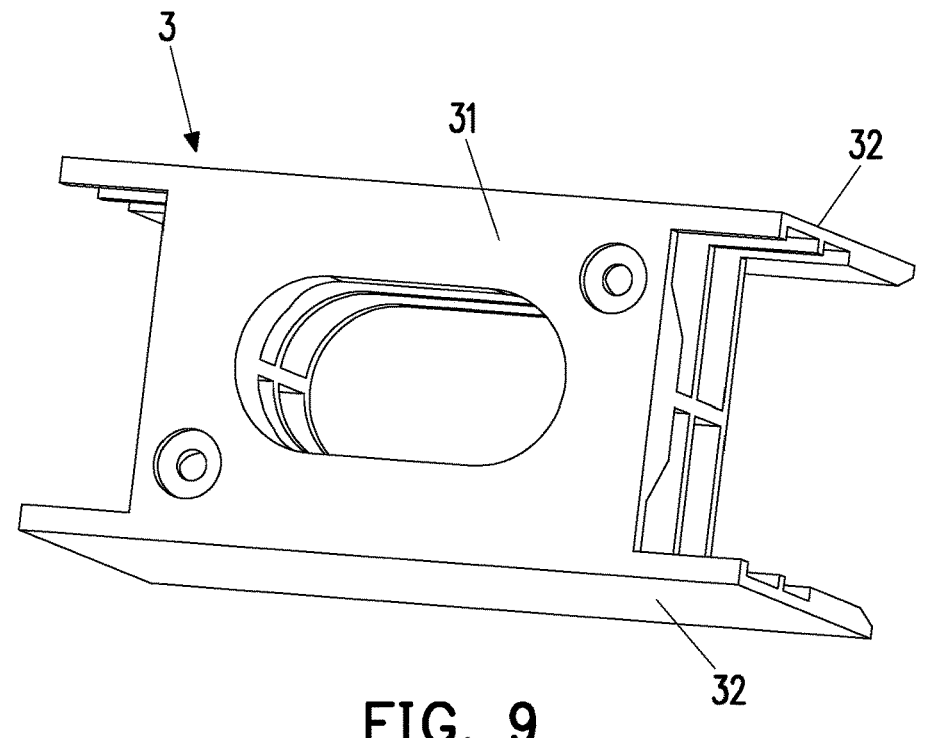
FIG. 9 is a schematic structural view of a separator of a battery apparatus according to an embodiment of the present disclosure.

Exemplarily, as shown in FIG. 1, FIG. 2, FIG. 7 and FIG. 9, the first extension member 2 is provided with a positioning protrusion 20 at the portion where the first extension member 2 intersects with the second extension member 4. The end portion of the separator 3 is provided with a slot 30, and the slot 30 of the separator 3 is inserted into the positioning protrusion 20 of the first extension member 2. Specifically, the positioning protrusion 20 may be an independent structural member, and is specifically arranged on the first extension member 2 through fasteners such as bolts. For example, the positioning protrusion 20 shown in FIG. 1, FIG. 2 and FIG. 7 is an independent structural member arranged on the first extension member 2; alternatively, the positioning protrusion 20 may also be a protrusion directly generated from the first extension member 2.

Exemplarily, as shown in FIG. 1 and FIG. 2, during the assembly process of the battery apparatus, a first extension member 2 may be assembled first, and then, with the first extension member 2 as a reference, a separator 3 is provided on at least one side of the two opposite sides of the first extension member 2. The assembly and positioning of the separator 3 is realized by inserting the separator 3 into the positioning protrusion 20 of the first extension member 2.

Exemplarily, as shown in FIG. 3 and FIG. 7, the first extension member 2 includes alternately arranged longitudinal beam 21 and liquid cooling plate 22. Each separator 3 is located between adjacent longitudinal beam 21 and liquid cooling plate 22. The longitudinal beam 21 is provided with a positioning protrusion 20. One end of the separator 3 is inserted into the positioning protrusion 20 on the longitudinal beam 21, and the liquid cooling plate 22 is used for exchange heat with the battery module 1, and is provided with a heat exchange channel. In order to avoid damage to the tightness of the heat exchange channel, the positioning protrusion 20 is not arranged on both sides of the liquid cooling plate 22.

Figure 5:
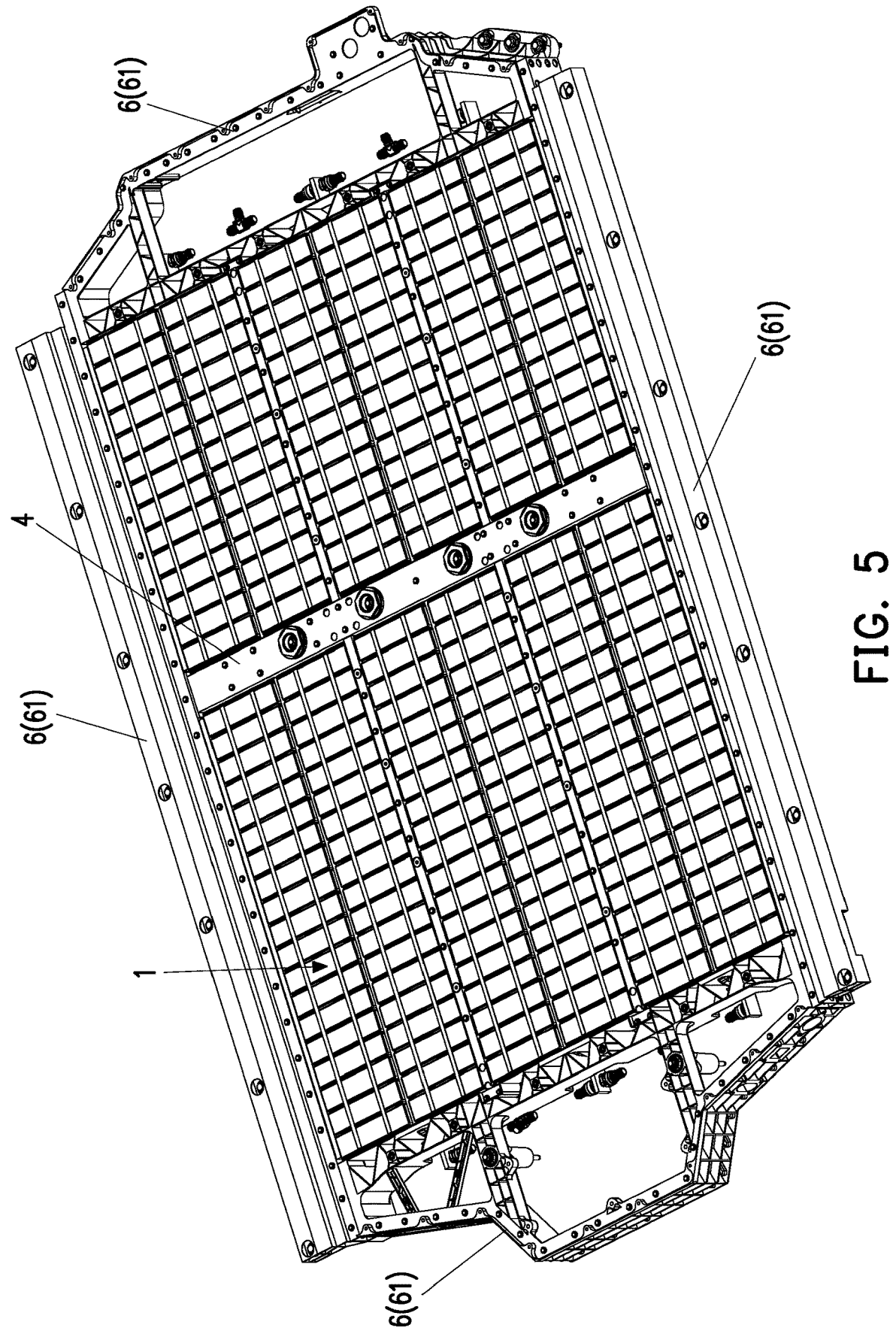
FIG. 5 is a schematic structural view of assembling a box body framework in place during the assembling process of a battery apparatus according to an embodiment of the present disclosure.
Figure 6:
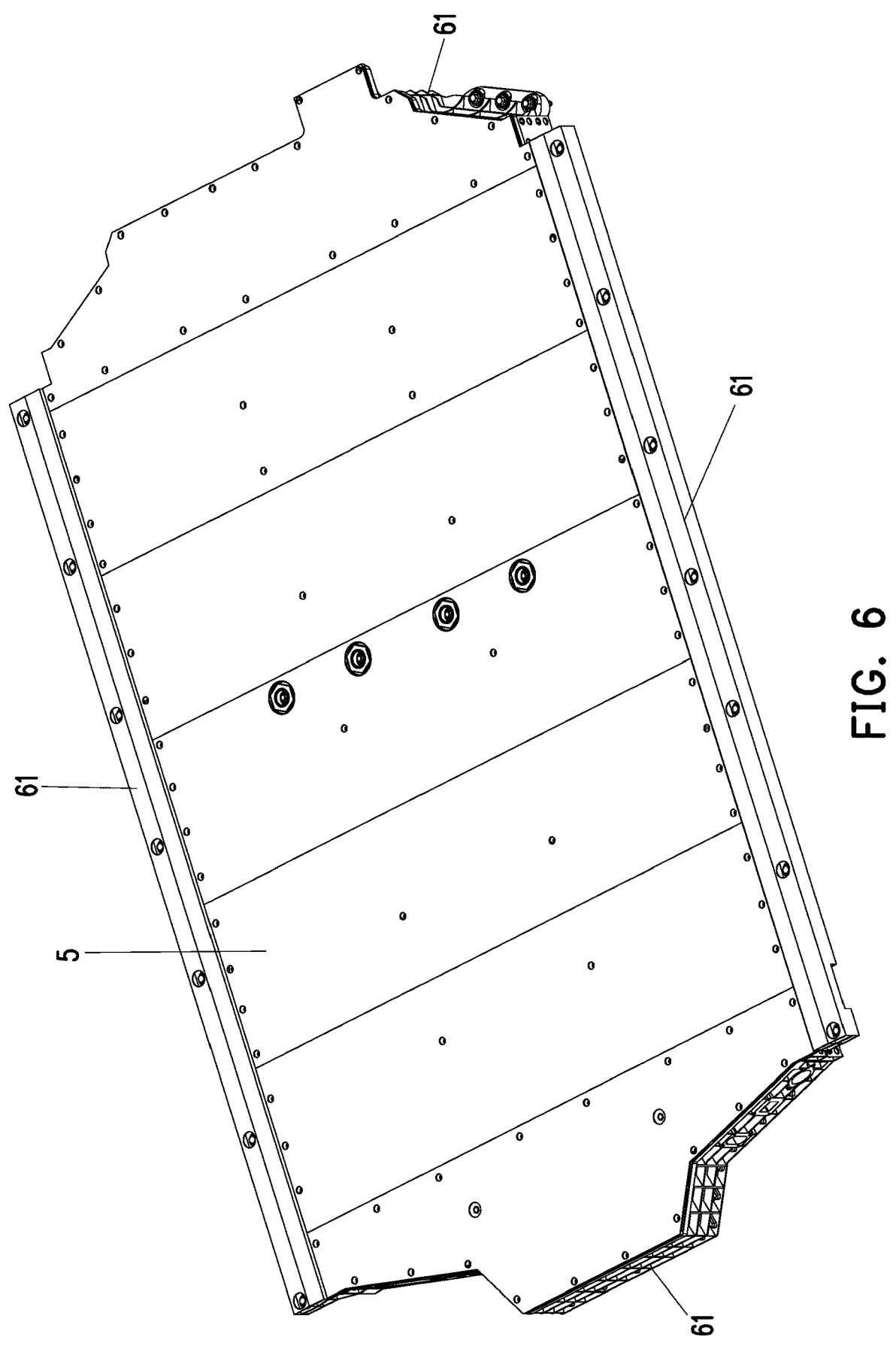
FIG. 6 is a schematic structural view of assembling a bottom plate of the box body in place during the assembling process of a battery apparatus according to an embodiment of the present disclosure.

In some embodiments, as shown in FIG. 5 and FIG. 6, the battery apparatus provided by the present disclosure further includes a box body framework 6, and the box body framework 6 includes four frames 61 surrounding walls around the box body.

Figure 4:
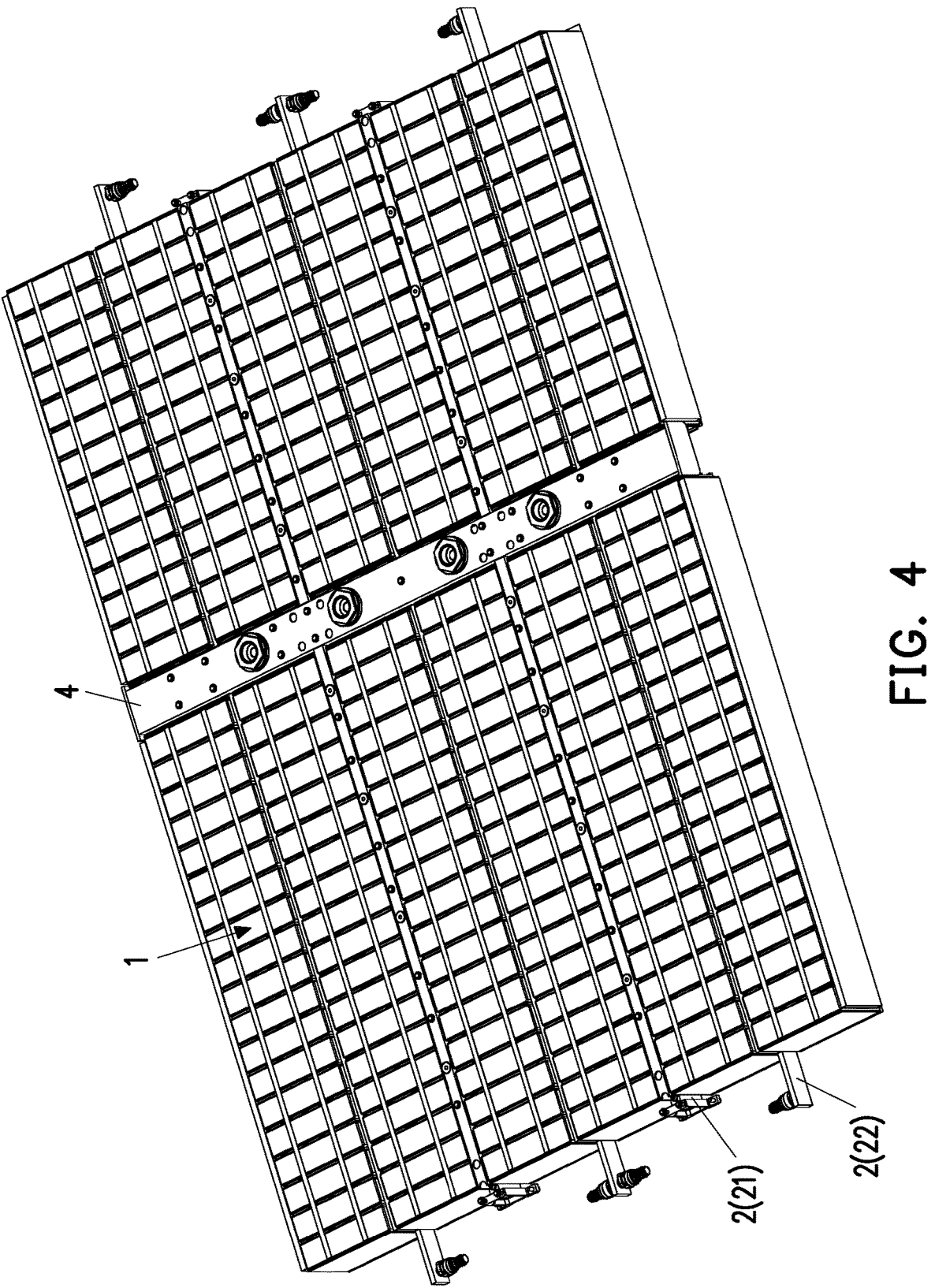
FIG. 4 is a schematic structural view of assembling the second extension member in place during the assembling process of a battery apparatus according to an embodiment of the present disclosure.

Specifically, as shown in FIG. 3, FIG. 4 and FIG. 5, after the first extension member 2, the separator 3, the battery 11 and the second extension member 4 are all assembled, the four frames 61 of the box body may be assembled. The four frames 61 are used to form the box body framework 6 to enclose the first extension member 2, the separator 3, the battery module 1 and the second extension member 4. In this way, after the battery module 1 is assembled, the complete box body framework 6 is assembled. The battery module 1 does not need to be assembled by overpressure to be vertically inserted into the box body, the configuration thereof is not limited by the box structure, so that the assembly efficiency and yield rate may be improved.

In an exemplary embodiment, the four frames 61 are connected by bonding and/or fasteners.

In this embodiment, non-welding means such as bonding and/or fastener and the like are used to connect the four frames 61. Compared with the method of welding the box body framework 6 in advance and then assembling the battery 11 afterwards, it is possible to avoid problems such as poor consistency of the box body caused by welding, poor assembly and insulation failure caused by welding slag and welding seams, etc.

In some embodiments, as shown in FIG. 3, FIG. 4 and FIG. 5, both ends of the second extension member 4 are respectively connected with the box body framework 6. The upper part of the second extension member 4 carries the separator 3 and the first extension member 2 intersecting with the second extension member 4. By connecting both ends of the second extension member 4 with the box body framework 6, the connection strength of the entire box body may be strengthened, and the reliability of the structure entire box body may be improved.

Further, both ends of the second extension member 4 are also connected to the box body framework 6 respectively, so as to further strengthen the connection strength and reliability of the entire box body.

Exemplarily, non-welding methods such as bonding, and/ or engaging connection, and/or fastener and the like are used to connect the box body framework 6 and the first extension member 2 and the second extension member 4 to avoid defects caused by welding slag and welding seams and the like.

In some embodiments, as shown in FIG. 7, the second extension member 4 and/or the bottom plate 5 of the box body are provided with a suspending member 7. The separator 3 is provided with an escape hole 33, and the suspending member 7 passes through the escape hole 33. It should be noted that, if the suspending member 7 is arranged on the bottom plate 5 of the box body, the second extension member 4 also needs to be provided with an escape hole, and the escape hole on the second extension member 4 needs to be communicated with the escape hole 33 provided by the separator 3 to allow the suspending member 7 to pass through both of them.

Specifically, when the battery apparatus is transported, the suspending member 7 is connected to the suspending fixture to lift and transfer the battery apparatus. In the battery apparatus of this embodiment, the bottom plate 5 of the box body, the second extension member 4, the first extension member 2 and the separator 3 are arranged from bottom to top in order. The bottom plate 5 of box body and the second extension member 4 are the main load-bearing structures of the box body framework 6. By arranging the suspending member 7 on the bottom plate 5 of box body and/or the second extension member 4, it is possible to improve the firmness and reliability of the entire box body during transportation. The escape hole 33 matched with the suspending member 7 is provided on the separator 3, which not only can realize the arrangement of suspending points, but also facilitate the assembly and positioning of the bottom plate 5 of box body and/or the second extension member 4, making it possible to improve the assembly efficiency and yield rate.

In the second aspect, based on the same inventive concept as the battery apparatus provided by the embodiment of the present disclosure, the present disclosure further provides an assembling method of the battery apparatus, as shown in FIG. 10. The assembling method includes the steps of arranging the first extension member 2 and the separator 3 and the step of assembling the battery module 1. The step of arranging first extension member 2 and separator 3 is step 101, the step of assembling the battery module 1 is step 102, and step 101 and step 102 are performed alternately in sequence.

Step 101, the step of arranging the first extension member 2 and the separator 3 includes: as shown in FIG. 1 and FIG. 2, the first extension member 2 serves as the positioning reference, the separator 3 is provided on at least one side of the first extension member 2. One side of the first extension member 2 where the separator 3 is provided is divided by the separator 3 into two areas, and the areas formed by each separator 3 are arranged along the extending direction of the first extension member 2.

Step 102, the step of assembling the battery module 1 includes: as shown in FIG. 2, the first extension member 2 and the separator 3 serve as the positioning reference at the same time, and the battery module 1 is provided in each area enclosed by the first extension member 2 and the separator 3.

In the assembling method of the battery apparatus provided by the present disclosure, there is no need to assemble the box body of the battery apparatus in advance. Rather, the assembling process of the battery 11 is integrated with the assembling step of the box body. First, the battery 11 is connected to part of the structure (first extension member 2, separator 3) used to form the box body, and the remaining part for forming the box body is assembled to form the complete box body. After assembling the battery 11, a complete box body is assembled. In this way, the entire assembling process is performed without a gap, which helps to establish a fully automated production line to improve production efficiency. Moreover, the factors that influence the yield rate of the battery apparatus will not be generated easily. For example, the step of assembling batteries 11 is not restricted to the structure of the box body, which helps to improve assembling efficiency and yield rate. Moreover, connection between various parts of box body structure that are assembled in sequence may be performed through non-welding means such as bonding and/or fastener. Compared with the method of using welding to form the box body in advance to assemble the battery 11, it is possible to avoid the poor consistency of the box body caused by welding, poor assembly and insulation failure caused by welding slag and welding seams, etc.

In addition, in this disclosure, the battery module 1 is assembled with the first extension member 2 and the separator 3 adjacent thereto as the positioning reference, and the first extension member 2 and the separator 3 adjacent thereto are used to limit the positions of two or three peripheral sides of the battery module 1, so that fast assembling and positioning of battery module 1 may be realized. In the meantime, the battery module 1 may be assembled into the chamber encircled by the first extension member 2 and the separator 3 from one peripheral side or two peripheral sides that are open, so as to prevent adhesive layer scratching that is caused when the battery module 1 has to be over-pressed into the box and avoid defects such as excessive pressure between the batteries 11.

In summary, the method for assembling a battery apparatus provided by the present disclosure can improve the assembling efficiency and yield rate of the battery apparatus.

In some embodiments, in step 102, the step of arranging the battery module 1 in each area enclosed by the first extension member 2 and the separator 3 includes: as shown in FIG. 2 and FIG. 3, the lateral surface of the batteries 11 in the battery module 1 is adhered to the first extension member 2, and the large surface of the battery 11 at the end portion in the battery module 1 is in contact with the separator 3.

In this way, the accuracy of the assembly and positioning of the battery module 1 can be ensured, and the batteries 11 in the battery module 1 can be pre-fixed, thereby facilitating subsequent assembly and improving the reliability of the entire assembly process.

Exemplarily, when assembling the battery module 1, each battery 11 in battery module 1 may be adhered to the first extension member 2 in sequence, or a plurality of batteries 11 may be arranged in a set and adhered to first extension member 2 together. The specific operation method may be performed based on the actual situation.

In some embodiments, in step 101, with the first extension member 2 serving as the reference line, a separator 3 is provided on at least one side of the first extension member 2, which specifically includes:

As shown in FIG. 1, FIG. 2, FIG. 7 and FIG. 9, at least one of the two opposite sides of the first extension member 2 is provided with a positioning protrusion 20. Both ends of the separator 3 are provided with slots 30, and the slot 30 of the separator 3 is inserted into the positioning protrusion 20 of the first extension member 2.

Exemplarily, in the assembling process of the battery apparatus, a first extension member 2 may be assembled first, and then a separator 3 may be arranged on at least one of the two opposite sides of the first extension member 2 based on the first extension member 2 as the reference. By inserting the separator 3 into the positioning protrusion 20 of the first extension member 2, the assembly and positioning of the separator 3 may be realized.

In some embodiments, step 101 and step 102 are performed alternately, specifically including:

As shown in FIG. 1, FIG. 2 and FIG. 3, after the battery module 1 is arranged in the area enclosed by each first extension member 2 and the separator 3 adjacent thereto, a new first extension member 2 and the separator 3 adjacent to the new first extension member 2 are arranged subsequently. The successively arranged first extension members 2 are arranged in order along the extending direction perpendicular to the first extension member 2, and a set of separators 3 are arranged between adjacent first extension members 2 to divide the area. That is, a set of separators 3 are provided between adjacent first extension members 2, and the set of separators 3 include one separator 3 or include two or more separators 3 arranged along the extending direction of the first extension member 2. Further, through the set of separators 3, the adjacent first extension members 2 may be divided into two or more areas, so as to accommodate two or more battery modules 1. In this way, using a first extension member 2 and a row of battery modules 1 alternately and cyclically for arrangement not only can avoid a series of defects caused by first forming the chamber structure of the box body and then assembling the battery module 1 afterwards, but also can help to establish a fully automated production line, thus improving production efficiency, realizing high-speed manufacturing and high-yield manufacturing, and the manufacturing costs may be reduced.

In some embodiments, in step 101, the step of arranging the first extension member 2 and the separator 3, specifically includes:

As shown in FIG. 2, FIG. 3, FIG. 4 and FIG. 7, the separators 3 on both sides of each first extension member 2 are symmetrically arranged, and the symmetrical separators 3 with respect to the first extension member 2 are aligned and arranged on a straight line. That is, the entire battery apparatus includes one or more rows of separators 3, and the extending direction of each separator 3 in each row of separator 3 is on a straight line, so that the second extension member 4 that intersects with the first extension member 2 may be easily assembled along the straight line.

Exemplarily, after all the first extension member 2, the separator 3 and the battery module 1 are arranged, the assembling method further includes the following steps:

In step 103, as shown in FIG. 3 and FIG. 4, in the arrangement of the second extension member 4, the second extension member 4 and the first extension member 2 intersect each other vertically, so that the second extension member 4 passes through each separator 3 on a straight line, and is connected to each separator 3 passed through by the second extension member 4.

As shown in FIG. 3, FIG. 4, FIG. 7 and FIG. 8, the second extension member 4 is assembled after all the first extension member 2, the separator 3 and the battery module 1 are arranged, so that it can be ensured that both the separator 3 and the first extension member 2 are located on the same side of the second extension member 4, and the second extension member 4 may be simultaneously connected with a plurality of separators 3 arranged along the extending direction thereof, and connected with one or more first extension members 2 intersecting the second extension member 4. In this manner, it is possible to enhance the connection tightness and connection strength between the structures, and the reliability of the structure of entire box body may be improved.

In some embodiments, as shown in FIG. 3, FIG. 4, FIG. 5, FIG. 6, FIG. 7 and FIG. 8, all the first extension member 2, the separator 3, the battery module 1 and the second extension member 4 are assembled in an inverted manner. In this way, the initial module formed by the arrangement of all the first extension member 2, the separator 3, the battery module 1 and the second extension member 4 is inverted. It is not necessary to move or flip the initial module, the bottom plate 5 of box body may be directly arranged on the inverted initial module. The bottom plate 5 of box body is arranged on one side of the second extension member 4 away from the first extension member 2 and the separator 3, and the bottom plate 5 of box body is connected with the bottom surface of the second extension member 4. Since the initial module is upside down, it is easy to arrange the locking member and the like on one side of the bottom plate 5 of box body.

In some embodiments, after step 103, that is, after arranging the second extension member 4, the following steps are further included:

In step 104, as shown in FIG. 4 and FIG. 5, the frame 61 around the box body is arranged, and the frame 61 around the box body is connected with the two ends of the first extension member 2 and the second extension member 4 respectively to form the box body framework 6.

In an exemplary embodiment, step 103 may be performed before arranging the bottom plate 5 of box body. Specifically, as shown in FIG. 5 and FIG. 6, after arranging the frame 61 surrounding the box body, the bottom plate 5 of box body is assembled subsequently.

Further, after assembling the bottom plate 5 of box body, the assembled initial module is turned over to assemble structures such as the busbar, wiring harness board assembly, and the cover plate of box body.

Specifically, the stability of the initial module formed by assembling the first extension member 2, the second extension member 4, the battery module 1 and the frame 61 of box body is improved, and helps to predetermine the relative position between each battery 11 and the frame 6 of box body. As such, it is possible to facilitate the subsequent arrangement operations of the remaining parts of the structure (e.g., the bottom plate 5 of box body and the busbar), and helps to improve the overall assembly yield rate and efficiency of the final battery apparatus.

Certainly, the assembling method of the battery apparatus provided in the embodiment of the present disclosure is not limited to the specific method described in the above-mentioned embodiment, and may be adjusted according to the specific situation in the actual process.

Specifically, the assembling method of the battery apparatus provided by the present disclosure has the same inventive concept as the battery apparatus provided by the present disclosure, and has the same embodiments and advantageous effects, therefore no repetition is incorporated herein.

Specifically, the battery apparatus provided in this embodiment may be a battery pack. The bottom plate of the battery apparatus may include a liquid cooling plate. The battery module and the extension member are fixed through adhesive, so as to reduce the pressure of the battery module on the liquid cooling plate, and improve the installability and reliability of the battery pack.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery apparatus, comprising a first extension member, a second extension member, a separator and a plurality of battery modules, wherein the first extension member and the second extension member are arranged as partially overlapped to intersect each other and enclose a plurality of chambers, each chamber is provided with a battery module of said plurality of battery modules, the second extension member is segmented by the first extension member and each of the segments is provided with one separator, the separator is in contact with the battery module, and the separator and the first extension member are on the same side of the second extension member, wherein each of the separator is arranged on the second extension member at intervals along an extending direction of the second extension member and is independent of each other, wherein the battery apparatus further comprises a box body framework, and the box body framework comprises four frames forming surrounding walls of a box body, wherein the four frames are connected by non-welding, wherein an extending direction of the separator is the same as the extending direction of the second extension member, and at least one end of the separator in the extending direction is insertion-fitted with the first extension member, wherein the first extension member is provided with a positioning protrusion at a portion where the first extension member intersects with the second extension member, an end portion of the separator is provided with a slot, and the slot of the separator is inserted into the positioning protrusion of the first extension member.

2. The battery apparatus according to claim 1, further comprising a bottom plate of a box body, and the separator and the first extension member are located on one side of the second extension member away from the bottom plate of the box body, and the bottom plate of the box body is connected to a bottom surface of the second extension member.

3. The battery apparatus according to claim 2, wherein the second extension member or the bottom plate of the box body are provided with a suspending member, and the separator is provided with an escape hole, and the suspending member passes through the escape hole.

4. The battery apparatus according to claim 1, wherein the battery module comprises a plurality of batteries arranged in a direction perpendicular to a large surface of the battery, and the large surface of the battery at an end portion in the battery module is in contact with the separator.

5. The battery apparatus according to claim 4, wherein lateral surfaces of the plurality of batteries in the battery module are adhered to the first extension member.

6. The battery apparatus according to claim 1, wherein the separator is arranged across the second extension member, comprising a main body portion and two side plates connected to both ends of the main body portion arranged oppositely, the two side plates are respectively in contact with two adjacent battery modules of said plurality of battery modules.

7. The battery apparatus according to claim 1, wherein the separator and the second extension member are detachably connected.

8. The battery apparatus according to claim 1, wherein the four frames are connected through bonding and/or fasteners.

9. The battery apparatus according to claim 4, wherein the four frames are connected through bonding and/or fasteners.

10. The battery apparatus according to claim 8, wherein both ends of the second extension member are respectively connected with the box body framework.

* * * * *